United States Patent Office 3,379,713
Patented Apr. 23, 1968

3,379,713
BENZOTHIAZOLYL AZO DYESTUFFS
David J. Wallace and Max A. Weaver, Kingsport, Tenn., assignors to Eastman Kodak Company, Rochester, N.Y., a corporation of New Jersey
No Drawing. Filed May 24, 1965, Ser. No. 458,417
11 Claims. (Cl. 260—158)

ABSTRACT OF THE DISCLOSURE

Benzothiazolyl-azo-aniline compounds containing a di(acyl)amidoalkyl group attached to the aniline nitrogen atom of the coupler component are useful as dyes for hydrophobic textile materials.

---

This invention relates to azo compounds particularly useful as dyes for textile fibers, yarns and fabrics. More particularly this invention relates to azo compounds derived from diazotized aromatic amines and couplers of the general formula I
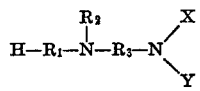

wherein $R_1$ represents p-phenylene or p-phenylene substituted with lower alkyl, e.g. methyl-p-phenylene; lower alkoxy, e.g. methoxy - p - phenylene, 2,5-dimethoxy-p-phenylene; halogen, e.g. chloro-p-phenylene; lower alkanoylamido, e.g. acetamido-p-phenylene; lower alkylsulfonamido, e.g. methylsulfonamido-p-phenylene; or lower alkylthio, e.g. methylthio-p-phenylene.

$R_2$ represents hydrogen or an alkyl radical preferably lower alkyl, i.e. from 1 to 4 carbon atoms, being unsubstituted or substituted such as hydroxyalkyl, e.g. hydroxyethyl; lower alkoxyalkyl, e.g. methoxyethyl; cyanoalkyl, e.g. cyanoethyl; lower alkanoyloxyalkyl, e.g. acetoxyethyl; lower carboalkoxyalkyl, e.g. carbethoxyethyl; halogenoalkyl, e.g. chloroethyl; lower alkylsulfonylakyl, e.g. methyl sulfonylethyl; carboxamidoalkyl, e.g. carboxamidoethyl, etc. or $R_2$ represents a monocyclic aromatic radical of the benzene series including unsubstituted phenyl and substituted phenyl, e.g. lower alkylphenyl, lower alkoxyphenyl and halophenyl.

$R_3$ represents a lower alkylene group i.e. a straight or branched chain from 1 to 4 C atoms, and X and Y represent the same or different acyl groups, such as lower alkanoyl; e.g. propionyl; aroyl, e.g. benzoyl lower alkylbenzoyl, lower alkoxybenzoyl, halobenzoyl; lower alkoxycarbonyl, e.g. ethoxy carbonyl; carbamoyl, e.g. phenyl carbamoyl; etc. or; sulfonyl groups such as, alkysulfonyl, e.g. methylsulfonyl; arylsulfonyl, e.g. phenylsulfonyl lower akylphenysulfonyl, lower alkoxyphenylsulfonyl, halophenylsulfonyl; etc.

The coupling components having the above Formula I are prepared by the following reactions:

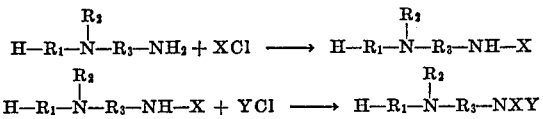

wherein $R_1$, $R_2$, $R_3$, X and Y are as defined above.

These reactions result in compounds in which the newly substituted amines are diacyl substituted disulphonyl substituted or acylsulphonyl substituted depending on the reactants chosen.

The aromatic amines, $RNH_2$ used in the production of the azo compounds of this invention are those in which the R group represents a benzothiazole radical having a general formula II

wherein $\phi$ene represents an orthophenylene radical which may contain one or more independently selected groups such as, lower alkyl, lower alkoxy, halo, cyano, nitro, lower alkylsulfonyl, lower alkanoylamido, carbamoyl, sulfamyl, mercapto and the like. Although these groups are not critical and can be varied, the cyano, nitro, and lower alkylsulfonyl groups are particularly effective when used in the azo compounds of this invention.

The azo compounds of this invention have the following general formula:

III
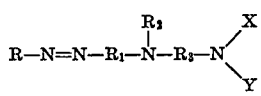

wherein R, $R_1$, $R_2$, $R_3$, X and Y have the meanings given above.

Accordingly, the invention contemplates compounds of the three general formulas:

IV
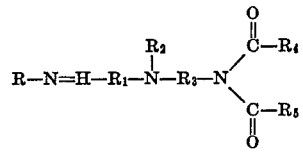

V
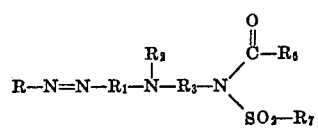

VI
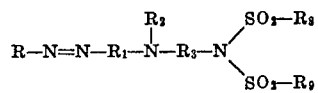

wherein
$R_4$ and $R_5$=lower alkyl, lower alkoxy phenyl, or phenyl substituted with lower alkyl, lower alkoxy, or halogen,
$R_6$ and $R_7$=lower alkyl, phenyl, or phenyl substituted with lower alkyl, lower alkoxy, or halogen, and
$R_8$ and $R_9$=lower alkyl, phenyl, or phenyl substituted with lower alkyl, lower alkoxy, or halogen.

The specific alkyl radicals and monovalent analogs of the p-phenylene radicals given above are also exemplary of the $R_4$-$R_9$ group.

These are prepared by diazotization of the 2-aminobenzothiazoles described above followed by coupling the diazotized products with the coupler of general Formula I.

The groups X and Y differentiate these compounds from prior art compounds and favorably affect the dye characteristics such as light fastness and resistance to sublimation, especially when the compounds are used for dyeing textile materials. The substituents attached to the benzothiazolyl radical R, or to $R_1$–$R_9$ are not critical and serve primarily as auxochromes to control the color of the azo compound.

The azo compounds can be used for dyeing textile materials including synthetic polymer fibers, yarns and fabrics giving a variety of fast shades including blue, yellow, red and brown when applied thereto by conventional dyeing methods. The compounds have moderate affinity for cellulose ester and polyamide fibers and possess the valuable property of staining wool less than do previous benzothiazole dyes. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative intermediates and azo compounds of our invention.

EXAMPLES OF COUPLERS

Preparation of N-[2-(N'-ethyl-m-toluidino)ethyl]diacetamide.—19.7 g. N-2-chloroethyl-N-ethyl-m-toluidine, 15.2 g. diacetamide, 13.8 g. potassium carbonate and 100 cc. diamethylformamide were heated and stirred together for 2 hrs. at 125° C. The mixture was drowned in water, and the product extracted with 2–50 cc. portions of chloroform. The combined extracts were washed once with water and dried over anhydrous sodium sulfate. The chloroform was stripped off under vacuum, leaving an oily product.

Preparation of N-acetyl-N-[2-(N'-ethyl-m-toluidino)ethyl]methanesulfonamide.—139 g. N-[2-(N'-ethyl-m-toluidino)ethyl]methanesulfonamide, sodium salt, was stirred in 300 cc. dry dimethylformamide. 39.3 g. acetyl chloride was added dropwise below 55° C. After 2 hrs. heating on the steam bath, the reaction mixture was drowned in dilute aqueous sodium hydroxide and stirred until the product solidified. The solid was filtered off, washed with water, and dried at room temperature. The product was a white solid, M.P. 55–58°. Recrystallization from ethanol gave a product melting at 63–64° C.

Preparation of N-benzoyl-N-[2-(N'-ethyl-m-toluidino)ethyl]methanesulfonamide.—139 g. N-[2-(N'-ethyl-m-toluidino)ethyl]methanesulfonamide, sodium salt was stirred in 300 ml. dimethylformamide and 70 g. benzoyl chloride was added dropwise over 1 hour. The temperature rose to 65° C. during the addition. The reaction was then heated on the steam bath for 2 hours, then poured into water. The product came down as an oil which was washed by decantation and crystallized on standing. A recrystallized sample (methanol) melted at 138–139.5° C.

Preparation of N-[2-(N'-ethyl-m-toluidino)ethyl]dimethanesulfonamide.—27.8 g. N-[2-(N'-ethyl-m-toluidino)ethyl]methanesulfonamide, sodium salt, was dissolved in 100 cc. dry dimethylformamide, 11.5 g. methanesulfonyl chloride was added dropwise with stirring. The temperature rose to 75° C. After heating 1 hr. at 75–90°, the reaction mixture was drowned in water. The oily product crystallized on standing. It was filtered off, washed with water, and recrystallized from 50 cc. ethanol. White solid, M.P. 77–78.5°.

These examples are illustrative of the procedures utilized for preparation of the coupler moiety of the dyes in the table below.

EXAMPLES OF THE DYES

Example 1

(A) Diazotization.—9.12 g. (.04 mole) 2-amino-6-methylsulfonylbenzothiazole was stirred in 96 cc. water and 57.2 cc. conc. sulfuric acid was added. The mixture was cooled in an ice-bath and a solution of 3.36 g. sodium nitrite in 20 cc. conc. sulfuric acid was added. The cooled reaction mixture was stirred for about 2 hours.

(B) Coupling.—The cold diazotization solution was added to a cold, stirred solution of 12.03 g. (.04 mole) N - [2-(N'-ethyl-m-toluidino)ethyl]dimethanesulfonamide in 500 cc. of 15% sulfuric acid. The reaction mixture was stirred for 2 hrs. at ice-bath temperature, drowned, filtered, washed with water and dried. The product dyes cellulose acetate and polyester fibers deep red shades of excellent fastness properties. The dye has the following structure:

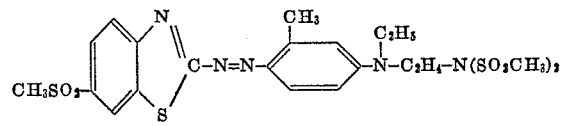

Example 2

(A) Diazotization.—9.12 (.04 mole) 2-amino-6-methylsulfonylbenzothiazole was stirred in 96 cc. water and 57.2 cc. conc. sulfuric acid was added. The mixture was cooled in an ice-bath and a solution of 3.36 g. $NaNO_2$ was slowly added. The cooled reaction mixture was stirred for about two hours.

(B) Coupling.—The diazotization solution was added to a cold, stirred solution of 11.95 g. (.04 mole) N-acetyl-N-[2-(N'-ethyl-m-toluidino)ethyl]methanesulfonamide in 500 cc. of 15% sulfuric acid. The reaction mixture was stirred for 2 hours at ice-bath temperature, drowned, filtered, washed with water and dried. The product dyes polyester fibers a deep red shade of excellent fastness properties. The dye has the following structure:

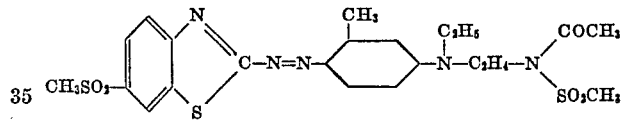

Example 3

9.12 g. (.04 mole) 2-amino-6-methylsulfonylbenzothiazole was diazotized as in Example 1 and added to a cold, stirred solution of 10.22 g. of N-[2-(N'-ethyl-m-toluidino)ethyl]diacetamide in 500 cc. of 15% sulfuric acid. The resultant mixture was stirred at ice-bath temperature for 2 hours then drowned, filtered, washed with water and dried. The product dyes polyester fibers a deep red shade of excellent fastness properties. The dye has the following structure:

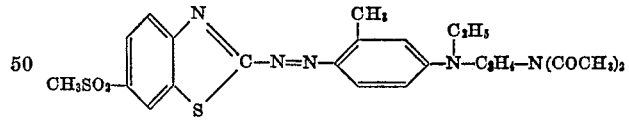

Example 4

7.08 g. (.04 mole) 2-amino-6-nitrobenzothiazole was diazotized by the method outlined in Example 1 above. The cold diazotization mixture was added to a cold, stirred solution of 12.03 g. (.04 mole) N-acetyl-N-[2-(N'-ethyl-m-toluidino)ethyl]methanesulfonamide in 500 cc. of 15% sulfuric acid. The reaction was stirred for two hours at ice-bath temperature, drowned, filtered, washed with water and dried. The product dyes polyester fibers a violet shade of excellent fastness properties.

Example 5

7.0 g. 2-amino-6-cyanobenzothiazole was diazotized by the method outlined in Example 1. The cold diazotization reaction solution was then added to a cold, stirred solution of 13.0 g. N-acetyl-N-[2-(N'-ethyl-m-toluidino)ethyl]methanesulfonamide in 500 cc. of 15% sulfuric acid. The reaction was stirred for two hours at ice-bath temperature, drowned, filtered, washed with water and dried. The product dyes polyester fibers a deep red of excellent fastness properties.

The dyes of the following table were made utilizing the preparative methods outlined above.

| Example No. | Substituents on the Diazotized 2-Aminobenzothiazole | Substituents on the Phenylene Radical, $R_1$ | $R_2$ | $R_3$ | X | Y | Coloring of Polyester Dyeings |
|---|---|---|---|---|---|---|---|
| 6 | 6-$SO_2CH_3$ | None | —$C_2H_5$ | —$CH_2CH_2$ | —$SO_2CH_3$ | —$SO_2CH_3$ | Red. |
| 7 | 6-$SO_2CH_3$ | 3-$CH_3$ | —$C_2H_5$ | —$CH_2CH_2$ | —$SO_2CH_3$ | —$COCH_3$ | Do. |
| 8 | 6-$SO_2CH_3$ | 3-$CH_3$ | —$C_2H_5$ | —$CH_2CH_2$ | —$SO_2CH_3$ | —$COC_6H_5$ | Do. |
| 9 | 6-$SO_2CH_3$ | 3-$CH_3$ | —$C_2H_5$ | —$CH_2CH_2$ | —$SO_2CH_3$ | —$COC_2H_5$ | Do. |
| 10 | 6-$SO_2CH_3$ | 3-$CH_3$ | —$C_2H_5$ | —$CH_2CH_2$ | —$SO_2CH_3$ | —$CO_2C_2H_5$ | Do. |
| 11 | 6-$SO_2CH_3$ | 3-$CH_3$ | —$C_2H_5$ | —$CH_2CH_2$ | —$SO_2CH_3$ | —$SO_2C_6H_5$ | Do. |
| 12 | 6-$SO_2CH_3$ | 3-$CH_3$ | —$C_2H_5$ | —$CH_2CH_2$ | —$COCH_3$ | —$COCH_3$ | Do. |
| 13 | 6-$SO_2CH_3$ | 3-$CH_3$ | —$C_2H_5$ | —$CH_2CH_2$ | —$COC_6H_5$ | —$COC_6H_5$ | Do. |
| 14 | 6-$SO_2CH_3$ | 3-$CH_3$ | —$C_2H_4CN$ | —$CH_2CH_2$ | —$SO_2CH_3$ | —$COCH_3$ | Do. |
| 15 | 6-$SO_2CH_3$ | 3-$CH_3$ | —$C_2H_4Cl$ | —$CH_2CH_2$ | —$SO_2CH_3$ | —$COCH_3$ | Do. |
| 16 | 6-$SO_2CH_3$ | 3-$CH_3$ | —$C_2H_4CONH_2$ | —$CH_2CH_2$ | —$SO_2CH_3$ | —$COCH_3$ | Do. |
| 17 | 6-$SO_2CH_3$ | 3-$CH_3$ | —$C_2H_4OH$ | —$CH_2CH_2$ | —$COCH_3$ | —$COCH_3$ | Do. |
| 18 | 6-$NO_2$ | 3,6-di-$CH_3$ | —$CH_3$ | (—$CH_2$—)$_3$ | —$SO_2CH_3$ | —$SO_2CH_3$ | Violet. |
| 19 | 6-$NO_2$ | 3-$CH_3$ | —$C_2H_5$ | —$CH_2CH_2$— | —$SO_2CH_3$ | —$SO_2CH_3$ | Do. |
| 20 | 6-$NO_2$ | 3-$CH_3$ | —$C_2H_4OCOCH_3$ | —$CH_2CH_2$— | —$SO_2CH_3$ | —$COCH_3$ | Do. |
| 21 | 6-$NO_2$ | 3-$CH_3$ | —$C_2H_4SO_2CH_3$ | —$CH_2CH_2$— | —$COCH_3$ | —$COCH_3$ | Do. |
| 22 | 6-$NO_2$ | 3-$OCH_3$ | —$C_2H_5$ | —$CH_2CH_2$— | —$COCH_3$ | —$COCH_3$ | Do. |
| 23 | 6-$NO_2$ | 3-Cl | —$C_2H_5$ | —$CH_2CH_2$— | —$COCH_3$ | —$COCH_3$ | Do. |
| 24 | 6-$NO_2$ | 3-$NHCOCH_3$ | —$C_2H_5$ | —$CH_2CH_2$— | —$COCH_3$ | —$COCH_3$ | Do. |
| 25 | 6-$NO_2$ | 3-$CH_3$-6-$OCH_3$ | —$C_2H_5$ | —$CH_2CH_2$ | $COCH_3$ | $COCH_3$ | Do. |
| 26 | 6-CN | 3-$CH_3$ | —$C_2H_5$ | —$CH_2CH_2$ | —$SO_2CH_3$ | —$SO_2CH_3$ | Do. |
| 27 | 6-$OCH_3$ | 3-$CH_3$ | $C_6H_5$ | —$CH_2CH_2$ | —$SO_2CH_3$ | —$SO_2CH_3$ | Do. |
| 28 | 6-$CH_3$ | 3-$CH_3$ | $C_6H_5$ | —$CH_2CH_2$ | —$SO_2CH_3$ | —$SO_2CH_3$ | Do. |
| 29 | 6-Cl | 3-$CH_3$ | $C_6H_5$ | —$CH_2CH_2$ | —$SO_2CH_3$ | —$SO_2CH_3$ | Do. |
| 30 | 6-$NHCOCH_3$ | 3-$CH_3$ | $C_6H_5$ | —$CH_2CH_2$ | —$SO_2CH_3$ | —$SO_2CH_3$ | Do. |
| 31 | 6-$SO_2N(CH_3)_2$ | 3-$CH_3$ | $C_6H_5$ | —$CH_2CH_2$ | —$SO_2CH_3$ | —$SO_2CH_3$ | Do. |
| 32 | 6-S-$CH_3$ | 3-$CH_3$ | $C_6H_5$ | —$CH_2CH_2$ | —$SO_2CH_3$ | —$SO_2CH_3$ | Do. |
| 33 | 4,6-di-$CH_3$ | 2-$CH_3$ | H | —$CH_2CH_2$ | —$SO_2CH_3$ | —$SO_2CH_3$ | Scarlet. |
| 34 | 6-$SO_2CH_3$ | 2-Cl | H | —$CH_2CH_2$ | —$SO_2CH_3$ | —$SO_2CH_3$ | Do. |
| 35 | 6-$SO_2C_2H_4CN$ | 3-$CH_3$ | —$C_2H_5$ | —$CH_2CH_2$ | —$SO_2CH_3$ | —$SO_2CH_3$ | Do. |
| 36 | 6-$SO_2H_4CN$ | 3-$CH_3$ | —$C_2H_5$ | —$CH_2CH_2$ | —$SO_2CH_3$ | —$SO_2CH_3$ | Do. |
| 37 | 6-$SO_2C_4H_9$ | 3-$CH_3$ | —$C_2H_5$ | —$CH_2CH_2$ | —$SO_2CH_3$ | —$SO_2CH_3$ | Do. |
| 38 | 6-$SO_2CH_2CH_2OH$ | 3-$CH_3$ | —$C_2H_5$ | —$CH_2CH_2$ | —$SO_2CH_3$ | —$SO_2CH_3$ | Do. |
| 39 | 6-$SO_2NH_2$ | 3-$CH_3$ | —$C_2H_5$ | —$CH_2CH_2$ | —$SO_2CH_3$ | —$SO_2CH_3$ | Do. |
| 40 | 6-$CH_3$-4-$NO_2$ | 3-$CH_3$ | —$C_2H_5$ | —$CH_2CH_2$ | —$SO_2CH_3$ | —$SO_2CH_3$ | Do. |
| 41 | 6-$SO_2CH_3$ | 3-$CH_3$ | —$C_2H_5$ | —$CH_2CH_2$ | —$SO_2CH_3$ | —$SO_2CH_3$ | Do. |
| 42 | 6-CN | 3-$CH_3$ | —$C_2H_5$ | —$CH_2CH_2$ | —$SO_2CH_3$ | —$COCH_3$ | Do. |
| 43 | 6-$NO_2$ | 3-$CH_3$ | —$C_2H_5$ | —$CH_2CH_2$ | —$SO_2CH_3$ | —$COCH_3$ | Violet. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monoethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all of the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel", "Dacron" and "Terylene", for example in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A water-insoluble azo compound having the formula

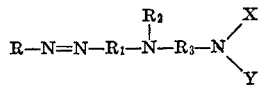

wherein
R = a 2-benzothiazolyl radical;
$R_1$ = p-phenylene or p-phenylene substituted with lower alkyl, lower alkoxy, halogen, lower alkylsulfonamido, lower alkanoylamido, or lower alkylthio;
$R_2$ = hydrogen; lower alkyl; lower alkyl substituted with hydroxy, lower alkoxy, cyano, lower alkanoyloxy, lower carboalkoxy, halogen, lower alkylsulfonyl, or carboxamido; phenyl or phenyl substituted with lower alkyl, lower alkoxy, or halogen.
$R_3$ = lower alkylene; and
X and Y are the same or different and each represents lower alkanoyl, benzoyl, lower alkylbenzoyl, lower alkoxybenzoyl, halobenzoyl, lower alkoxycarbonyl, carbamoyl, phenylcarbamoyl, lower alkylsulfonyl, phenylsulfonyl, lower alkylphenylsulfonyl, lower alkoxyphenylsulfonyl, or halophenylsulfonyl.

2. A water-insoluble azo compound according to claim 1 wherein R represents 2-benzothiazolyl or 2-benzothiaolyl substituted with lower alkyl, lower alkoxy, halogen, cyano, nitro, lower alkylsulfonyl, lower alkanoyl, carbamoyl, sulfamyl, or lower alkylthio.

3. A water-insoluble azo compound having the formula $$R-N=N-R_1-\underset{R_2}{N}-R_3-N\underset{Y}{\overset{X}{\diagdown}}$$

wherein
R = 6-lower alkylsulfonyl-2-benzothiazolyl, 6-nitro-2-benzothiazolyl, or 6-cyano-benzothiazolyl;
$R_1$ = p-phenylene, lower alkyl-p-phenylene, lower alkoxy-p-phenylene, halo-p-phenylene, or lower alkanoylamido-p-phenylene;
$R_2$ = lower alkyl or lower alkyl substituted with halogen, hydroxy, cyano or lower alkanoyloxy;
$R_3$ = lower alkylene;
X and Y are the same or different and each represents lower alkanoyl, benzoyl, lower alkylsulfonyl, or phenylsulfonyl.

4. A water-insoluble azo compound according to claim 3 wherein
$R_1$ = p-phenylene or lower alkyl-p-phenylene;
$R_2$ = lower alkyl;
$R_3$ = ethylene; and
X and Y = lower alkanoyl.

5. A water-insoluble azo compound according to claim 3 wherein
$R_1$ = p-phenylene or lower alkyl-p-phenylene;
$R_2$ = lower alkyl;
$R_3$ = ethylene;
X = lower alkanoyl; and
Y = lower alkylsulfonyl.

6. A water-insoluble azo compound according to claim 3 wherein
$R_1$ = p-phenylene or lower alkyl-p-phenylene;
$R_2$ = lower alkyl;
$R_3$ = ethylene; and
X and Y = lower alkylsulfonyl.

7. An azo compound of the formula

8. An azo compound of the formula

9. An azo compound of the formula

10. An azo compound of the formula

11. An azo compound of the formula

References Cited

UNITED STATES PATENTS

| | | | |
|---|---|---|---|
| 2,346,013 | 4/1944 | Dickey | 260—158 XR |
| 2,683,708 | 7/1954 | Dickey et al. | 260—158 |
| 2,871,231 | 1/1959 | Straley et al. | 260—158 XR |
| 2,955,901 | 10/1960 | Kruckenberg | 260—158 XR |
| 3,287,347 | 11/1966 | Hahn et al. | 260—158 |

FLOYD D. HIGEL, *Primary Examiner.*